(12) United States Patent
Ruef et al.

(10) Patent No.: US 9,846,718 B1
(45) Date of Patent: Dec. 19, 2017

(54) DEDUPLICATING SETS OF DATA BLOCKS

(71) Applicant: EMC Corporation, Hopkinton, MA (US)

(72) Inventors: Richard P. Ruef, Santa Cruz, CA (US);
Ying Hu, Northborough, MA (US);
Kurt William Everson, Missouri City, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 182 days.

(21) Appl. No.: 14/231,162

(22) Filed: Mar. 31, 2014

(51) Int. Cl.
*G06F 7/00* (2006.01)
*G06F 17/00* (2006.01)
*G06F 17/30* (2006.01)

(52) U.S. Cl.
CPC ............... *G06F 17/30371* (2013.01)

(58) Field of Classification Search
CPC ......... G06F 17/30516; G06F 17/30303; G06F 17/30159; G06F 11/1453; G06F 3/0641
USPC ......................................................... 707/692
See application file for complete search history.

(56) References Cited

U.S. PATENT DOCUMENTS

| 8,442,952 | B1 * | 5/2013 | Armangau | G06F 17/30159 706/14 |
| 8,468,320 | B1 * | 6/2013 | Stringham | G06F 3/0608 707/610 |
| 8,583,607 | B1 * | 11/2013 | Chen | G06F 3/0641 707/692 |
| 2011/0016091 | A1 * | 1/2011 | Prahlad | G06F 11/1453 707/654 |
| 2012/0209814 | A1 * | 8/2012 | Zhang | G06F 11/1458 707/654 |
| 2012/0254125 | A1 * | 10/2012 | Bosson | G06F 11/1453 707/679 |
| 2013/0054545 | A1 * | 2/2013 | Anglin | G06F 17/3015 707/693 |
| 2013/0117516 | A1 * | 5/2013 | Sobolewski | G06F 12/16 711/162 |
| 2013/0117847 | A1 * | 5/2013 | Friedman | G06F 21/00 726/22 |
| 2013/0124552 | A1 * | 5/2013 | Stevenson | G06F 17/30864 707/759 |
| 2013/0318288 | A1 * | 11/2013 | Khan | G06F 3/0608 711/103 |
| 2013/0325821 | A1 * | 12/2013 | Amit | G06F 17/30159 707/692 |
| 2014/0032507 | A1 * | 1/2014 | Voigt | G06F 3/0641 707/692 |

* cited by examiner

*Primary Examiner* — Hosain Alam
*Assistant Examiner* — Nicholas Allen
(74) *Attorney, Agent, or Firm* — Krishnendu Gupta; Deepika Bhayana

(57) ABSTRACT

A method is used in deduplicating sets of data blocks. A candidate data object is identified for deduplicating a data object. A digest associated with the candidate data object matches a digest associated with the data object. Digest information of a set of data objects is evaluated. The set of data objects are selected for evaluation based on an association between location of the set of data objects and location of the candidate data object. Based on the evaluation, a deduplicating technique is applied for deduplicating the data object.

20 Claims, 9 Drawing Sheets

DEDUPLICATING SETS OF DATA BLOCKS

BACKGROUND

Technical Field

This application relates to deduplicating sets of data blocks.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Data deduplication (also referred to simply as "deduplication") is a space-saving technology intended to eliminate redundant (duplicate) data (such as, files) on a data storage system. By saving only one instance of a file, disk space can be significantly reduced. For example, if a file of size 10 megabytes (MB) is stored in ten folders of each employee in an organization that has ten employees. Thus, 100 megabytes (MB) of the disk space is consumed to maintain the same file of size 10 megabytes (MB). Deduplication ensures that only one complete copy is saved to a disk. Subsequent copies of the file are only saved as references that point to the saved copy, such that end-users still see their own files in their respective folders. Similarly, a storage system may retain 200 e-mails, each with an attachment of size 1 megabyte (MB). With deduplication, the disk space needed to store each attachment of size 1 megabyte (MB) is reduced to just 1 megabyte (MB) from 200 megabyte (MB) because deduplication only stores one copy of the attachment.

Data deduplication can operate at a file or a block level. File deduplication eliminates duplicate files (as in the example above), but block deduplication processes blocks within a file and saves unique copy of each block. For example, if only a few bytes of a document or presentation or a file are changed, only the changed blocks are saved. The changes made to few bytes of the document or the presentation or the file does not constitute an entirely new file.

While deduplication systems have helped make data management much easier, they also come with a number of challenges.

SUMMARY OF THE INVENTION

A method is used in deduplicating sets of data blocks. A candidate data object is identified for deduplicating a data object. A digest associated with the candidate data object matches a digest associated with the data object. Digest information of a set of data objects is evaluated. The set of data objects are selected for evaluation based on an association between location of the set of data objects and location of the candidate data object. Based on the evaluation, a deduplicating technique is applied for deduplicating the data object.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
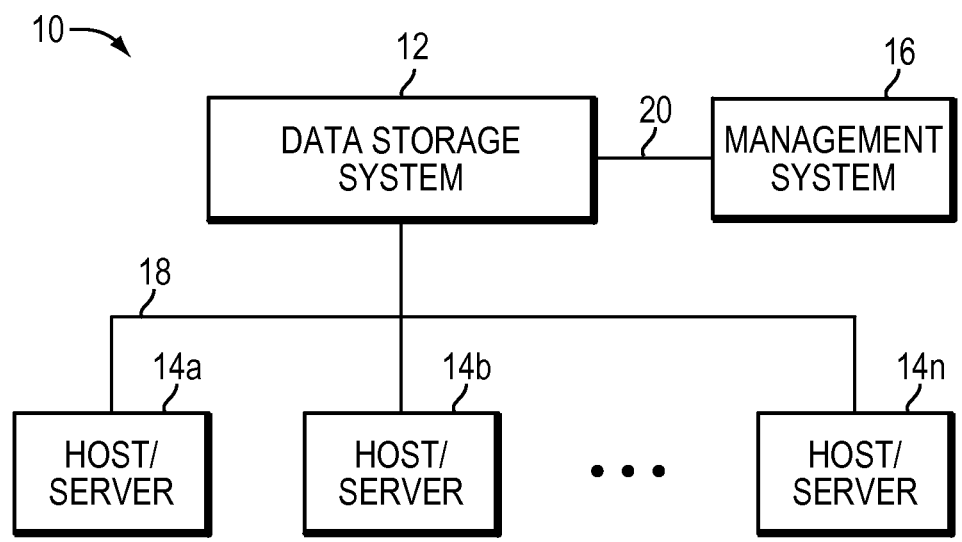
FIGS. 1 and 2 are examples of an embodiment of a computer system that may utilize the techniques described herein.

Described below is a technique for use in deduplicating sets of data blocks, which technique may be used to provide, among other things, identifying a candidate data object for deduplicating a data object, where a digest associated with the candidate data object matches a digest associated with the data object; evaluating digest information of a set of data objects, where the set of data objects are selected for evaluation based on an association between location of the set of data objects and location of the candidate data object, and based on the evaluation, applying a deduplicating technique for deduplicating the data object.

Data deduplication is a process by which a data storage system can detect multiple identical copies of data and only keeps a single copy of that data, thus eliminating the redundant data by removing other copies of that data and thus improving storage utilization. In at least some systems, data deduplication requires iterating over set of data blocks in one or more storage extents, finding the blocks that contain identical information by processing digest information associated with each block and mapping the identical blocks to a single copy of the data. In such systems, an index table of unique digests is created to find commonality among the data set.

Further, during iteration of data blocks of a deduplication domain, digest for each data block is computed and compared with digests stored in an index table. If a matching digest for a data block is found in an index table, contents of data blocks are compared to verify that the data blocks are duplicates of each other, and the data block is deduplicated to an identical data block associated with the matching digest found in the index table by updating address mapping information of the deduplicated data block to point to the identical data block found using the index table. Further, if no matching digest for a data block is found in an index table, the digest for the data block is added to the index table. Thus, deduplication maps data blocks that contain identical information to a single copy of the data thereby consolidating I/O operations directed to the identical data blocks to the single copy of the data.

Conventionally, data deduplication for feature software requires that data blocks in a storage extent be iterated, identified and processed for deduplication. A set of storage extents that may be deduplicated together form a deduplication domain. During the process of deduplication, an index table of unique digests is created from data contents of the blocks that are iterated through. Generally, a digest associated with a data block is smaller in size than the data block. For example, a digest for a data block of size 8 kilobytes (KB) may be of a size which may range from 8 bytes to 32 bytes. Typically, comparing digests of data blocks is faster than comparing contents of the data blocks because comparing contents of the data blocks include reading contents of the data blocks from a storage device. As a result, comparing digests of data blocks provides a fast and efficient way of determining identical data blocks if the digest of the data blocks matches with each other.

Generally, when a data block is evaluated for deduplication in a storage system, a determination is made as to whether a digest identical to the digest of the data block exists in an index table. If such digest does not exist in the index table, it may indicate that the data block is unique and is not identical to any other data block in the storage system. However, if such digest do exist in the index table, contents of a data block associated with the matching digest are read from a storage device and compared with contents of the data block. If contents of the data blocks matches, the data block is deduplicated to the data block with the matching digest. However, if contents of the data blocks do not match with each other, the data blocks are found to be unique and not identical to each other. Because a data block is mapped to a digest which is much smaller in size compared to the size of the data block, it is likely that digests for two data blocks may match with each other even though contents of the two data blocks are not identical to each other. Such a situation is referred to as a digest collision. Thus, a digest collision indicates a situation in which two data blocks have same digest but different content. A digest collision may result into a read operation required for reading contents of a data block from a storage device thereby consuming system resources.

Further, a digest is referred to as a strong digest if the probability of a digest collision is low. Further, a digest is referred to as a weak digest if the probability of a digest collision is high. Conventionally, a deduplicating technique uses a strong digest for a data block in order to avoid or reduce the number of times a digest collision may occur. Thus, in such a conventional system, a digest is computed in such a way that a probability of two data blocks being different but having the same digests is low. However, in such a conventional system, computing a strong digest requires a large amount of system resources (such as CPU time). In such a conventional system, a weak digest is not used by a deduplicating technique even though computing the weak digest is easier and faster compared to computing a strong digest because the weak digest results into a large number of digest collisions thereby causing additional read operation for comparing contents of data blocks upon finding matching digests. Thus, in such a conventional system, using a weak digest results into reading contents of a large number of data blocks from storage devices for comparison when a weak digest of a data block indicates that the data block is identical to another data block.

By contrast, in at least some implementations in accordance with the technique as described herein, the current technique uses a weak digest (such as Cyclic Redundancy Check ("CRC")) for applying a deduplicating technique efficiently by reducing the number of reads performed for comparing contents of data blocks. In at least one embodiment of the current technique, when a weak digest of a data block is evaluated for deduplication, weak digests of a set of data blocks adjacent to the data block are also evaluated for determining the probability of a digest collision such that a read operation for comparing contents of the data block may be avoided. Thus, in at least one embodiment of the current technique, reference of locality for data blocks is used to determine candidate data blocks for applying a deduplicating technique.

In at least some implementations in accordance with the technique as described herein, the use of the deduplicating sets of data blocks technique can provide one or more of the following advantages: lowering costs by improving deduplication efficiency, improving memory utilization by reducing the number of read operations, improving deduplication performance when using a weak digest by comparing digests of a set data blocks adjacent to the data block with weak digest, and reducing the amount of storage resources required for data deduplication with weak digest by storing digest information for a set of adjacent data blocks in the index table.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices such as, for example, an ATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like.

In certain cases, an enterprise can utilize different types of storage systems to form a complete data storage environment. In one arrangement, the enterprise can utilize both a block based storage system and a file based storage hardware, such as a VNX™ or VNXe™ system (produced by EMC Corporation, Hopkinton, Mass.). In such an arrangement, typically the file based storage hardware operates as a front-end to the block based storage system such that the file based storage hardware and the block based storage system form a unified storage system.

Figure 2:
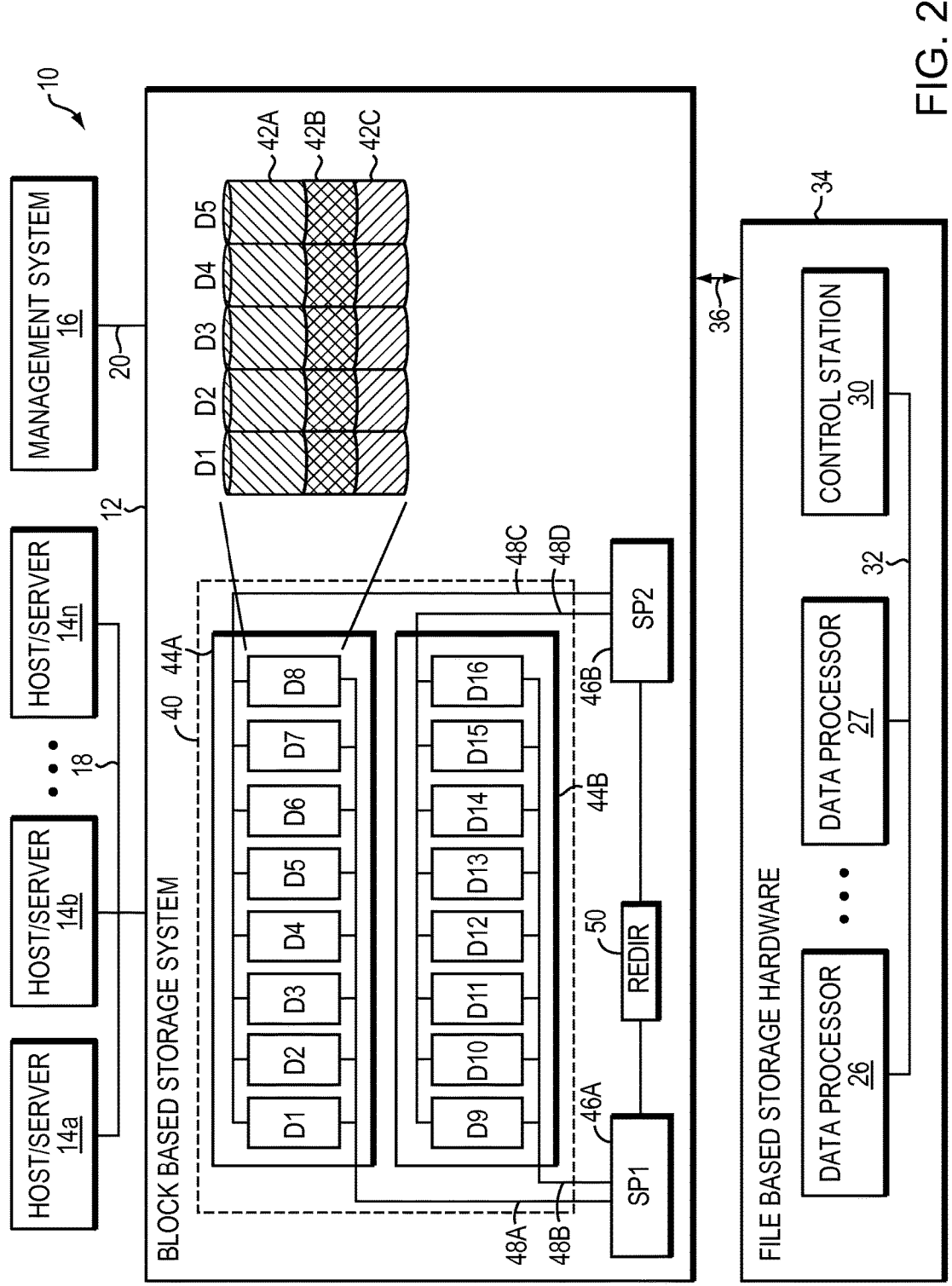

Referring now to FIG. 2, shown is an example of an embodiment of a computer system such as a unified data storage system that may be used in connection with performing the technique or techniques described herein. As shown, the unified data storage system 10 includes a block based storage system 12 and file based storage hardware 34. While the block based storage system 12 may be configured in a variety of ways, in at least one embodiment, the block based storage system 12 is configured as a storage area network (SAN), such as a VNX™ or VNXe™ system, as produced by EMC Corporation of Hopkinton, Mass. While the file based storage hardware 34 may be configured in a variety of ways, in at least one embodiment, the file based storage hardware 34 is configured as a network attached storage (NAS) system, such as a file server system produced by EMC Corporation of Hopkinton, Mass., configured as a header to the block based storage system 12.

The computer system 10 includes one or more block based data storage systems 12 connected to host systems 14a-14n through communication medium 18. The system 10 also includes a management system 16 connected to one or more block based data storage systems 12 through communication medium 20. In this embodiment of the computer system 10, the management system 16, and the N servers or hosts 14a-14n may access the block based data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the block based data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the block based data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

In at least one embodiment of the current technique, block based data storage system 12 includes multiple storage devices 40, which are typically hard disk drives, but which may be tape drives, flash memory, flash drives, other solid state drives, or some combination of the above. In at least one embodiment, the storage devices may be organized into multiple shelves 44, each shelf containing multiple devices. In the embodiment illustrated in FIG. 1, block based data storage system 12 includes two shelves, Shelf1 44A and Shelf2 44B; Shelf1 44A contains eight storage devices, D1-D8, and Shelf2 also contains eight storage devices, D9-D16.

Block based data storage system 12 may include one or more storage processors 46, for handling input/output (I/O) requests and allocations. Each storage processor 46 may communicate with storage devices 40 through one or more data buses 48. In at least one embodiment, block based data storage system 12 contains two storage processors, SP1 46A, and SP2 46B, and each storage processor 46 has a dedicated data bus 48 for each shelf 44. For example, SP1 46A is connected to each storage device 40 on Shelf1 44A via a first data bus 48A and to each storage device 40 on Shelf2 44B via a second data bus 48B. SP2 46B is connected to each storage device 40 on Shelf1 44A via a third data bus 48C and to each storage device 40 on Shelf2 44B via a fourth data bus 48D. In this manner, each device 40 is configured to be connected to two separate data buses 48, one to each storage processor 46. For example, storage devices D1-D8 may be connected to data buses 48A and 48C, while storage devices D9-D16 may be connected to data buses 48B and 48D. Thus, each device 40 is connected via some data bus to both SP1 46A and SP2 46B. The configuration of block based data storage system 12, as illustrated in FIG. 2, is for illustrative purposes only, and is not considered a limitation of the current technique described herein.

In addition to the physical configuration, storage devices 40 may also be logically configured. For example, multiple storage devices 40 may be organized into redundant array of inexpensive disks (RAID) groups. Although RAID groups are composed of multiple storage devices, a RAID group may be conceptually treated as if it were a single storage device. As used herein, the term "storage entity" may refer to either a single storage device or a RAID group operating as a single storage device.

Storage entities may be further sub-divided into logical units. A single RAID group or individual storage device may contain one or more logical units. Each logical unit may be further subdivided into portions of a logical unit, referred to as "slices". In the embodiment illustrated in FIG. 1, storage devices D1-D5, is sub-divided into 3 logical units, LU1 42A, LU2 42B, and LU3 42C. The LUs 42 may be configured to store a data file as a set of blocks striped across the LUs 42.

The unified data storage system 10 includes a file based storage hardware 34 that includes at least one data processor 26. The data processor 26, for example, may be a commodity computer. The data processor 26 sends storage access requests through physical data link 36 between the data processor 26 and the block based storage system 12. The data link 36 may be any one or more of a variety of networks or other type of communication connections as known to those skilled in the art. The processor included in the data processor 26 may be any one of a variety of proprietary or commercially available single or multiprocessor system, such as an Intel-based processor, or other type of commercially available processor able to support traffic in accordance with each particular embodiment and application. Further, file based storage hardware 34 may further include control station 30 and additional data processors (such as data processor 27) sharing storage device 40. A dual-redundant data link 32 interconnects the data processors 26, 27 to the control station 30. The control station 30 monitors a heartbeat signal from each of the data processors 26, 27 in order to detect a data processor failure. If a failed data processor cannot be successfully re-booted, the control station 30 will "fence off" the failed data processor and re-assign or fail-over the data processing responsibilities of the failed data processor to another data processor of the file based storage hardware 34. The control station 30 also provides certain server configuration information to the data processors 26, 27. For example, the control station maintains a boot configuration file accessed by each data processor 26, 27 when the data processor is reset.

The data processor 26 is configured as one or more computerized devices, such as file servers, that provide end user devices (not shown) with networked access (e.g., NFS and CIFS facilities) to storage of the block based storage system 12. In at least one embodiment, the control station 30 is a computerized device having a controller, such as a memory and one or more processors. The control station 30 is configured to provide hardware and file system management, configuration, and maintenance capabilities to the data storage system 10. The control station 30 includes boot strap operating instructions, either as stored on a local storage device or as part of the controller that, when executed by the controller following connection of the data processor 26 to the block based storage system 12, causes the control station 30 to detect the automated nature of a file based storage hardware installation process and access the data processor 26 over a private internal management network and execute the file based hardware installation process.

Figure 3:
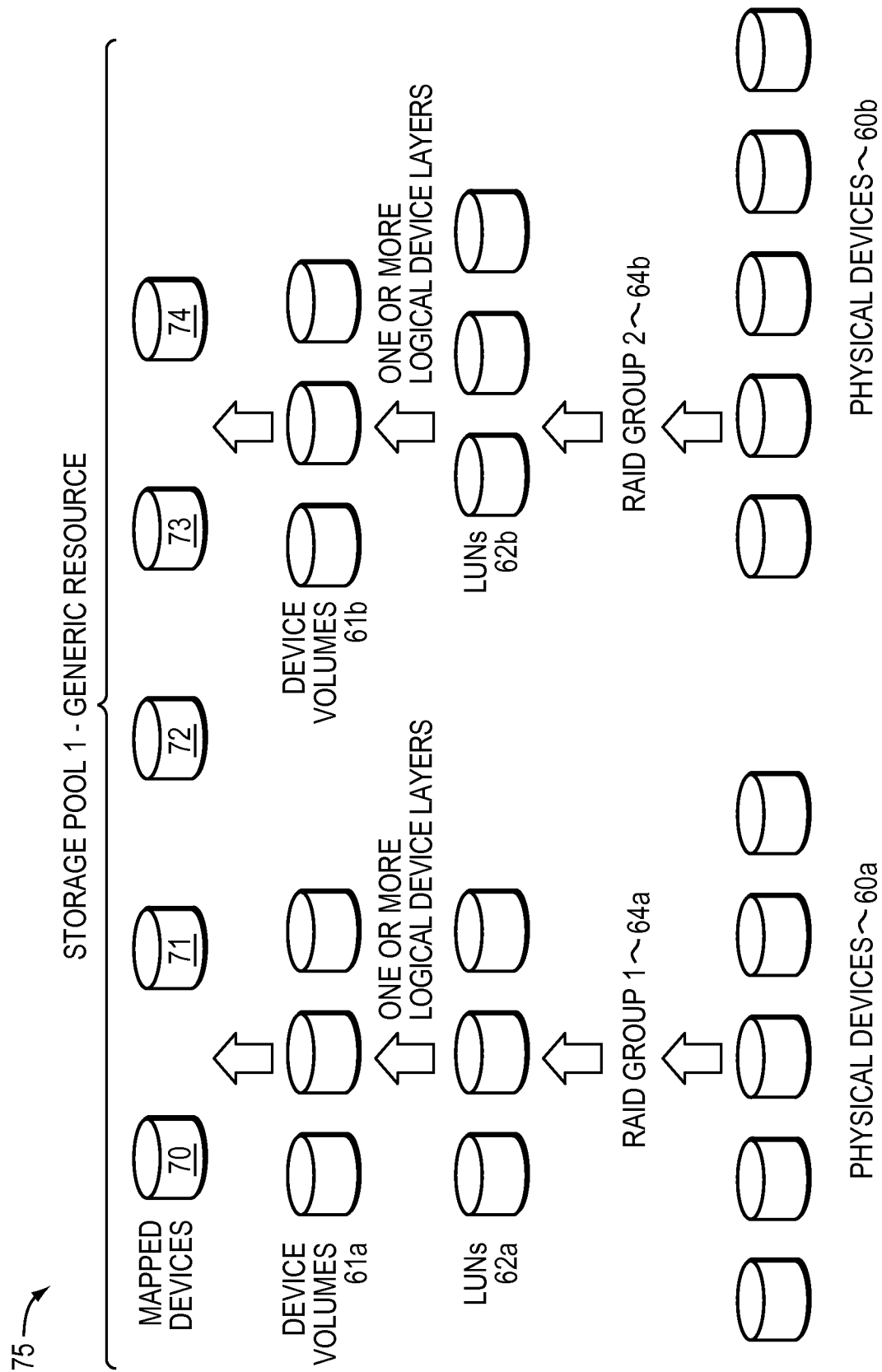
FIG. 3 is an example illustrating storage device layout.

Referring to FIG. 3, shown is an example representing how data storage system best practices may be used to form storage pools. The example 75 illustrates how storage pools may be constructed from groups of physical devices. For example, RAID Group1 64*a* may be formed from physical devices 60*a*. The data storage system best practices of a policy may specify the particular disks and configuration for the type of storage pool being formed. For example, for physical devices 60*a* on a first data storage system type when forming a storage pool, RAID-5 may be used in a 4+1 configuration (e.g., 4 data drives and 1 parity drive). The RAID Group 1 64*a* may provide a number of data storage LUNs 62*a*. An embodiment may also utilize one or more additional logical device layers on top of the LUNs 62*a* to form one or more logical device volumes 61*a*. The particular additional logical device layers used, if any, may vary with the data storage system. It should be noted that there may not be a 1-1 correspondence between the LUNs of 62*a* and the volumes of 61*a*. In a similar manner, device volumes 61*b* may be formed or configured from physical devices 60*b*. The storage pool 1 of the example 75 illustrates two RAID groups being used to define a single storage pool although, more generally, one or more RAID groups may be used for form a storage pool in an embodiment using RAID techniques.

The data storage system 12 may also include one or more mapped devices 70-74. A mapped device (e.g., "thin logical unit", "direct logical unit") presents a logical storage space to one or more applications running on a host where different portions of the logical storage space may or may not have corresponding physical storage space associated therewith. However, the mapped device is not mapped directly to physical storage space. Instead, portions of the mapped storage device for which physical storage space exists are mapped to data devices such as device volumes 61*a*-61*b*, which are logical devices that map logical storage space of the data device to physical storage space on the physical devices 60*a*-60*b*. Thus, an access of the logical storage space of the mapped device results in either a null pointer (or equivalent) indicating that no corresponding physical storage space has yet been allocated, or results in a reference to a data device which in turn references the underlying physical storage space.

Further, device volumes 61, LUNs 62 and physical disk devices 60 may be configured to store one or more blocks of data or one or more files organized as a file system. A storage extent may be formed or configured from one or more LUNs 62. Thus, a deduplication domain consisting of a set of storage extents includes a set of deduplicated LUNs sharing a common set of blocks.

Figure 4:
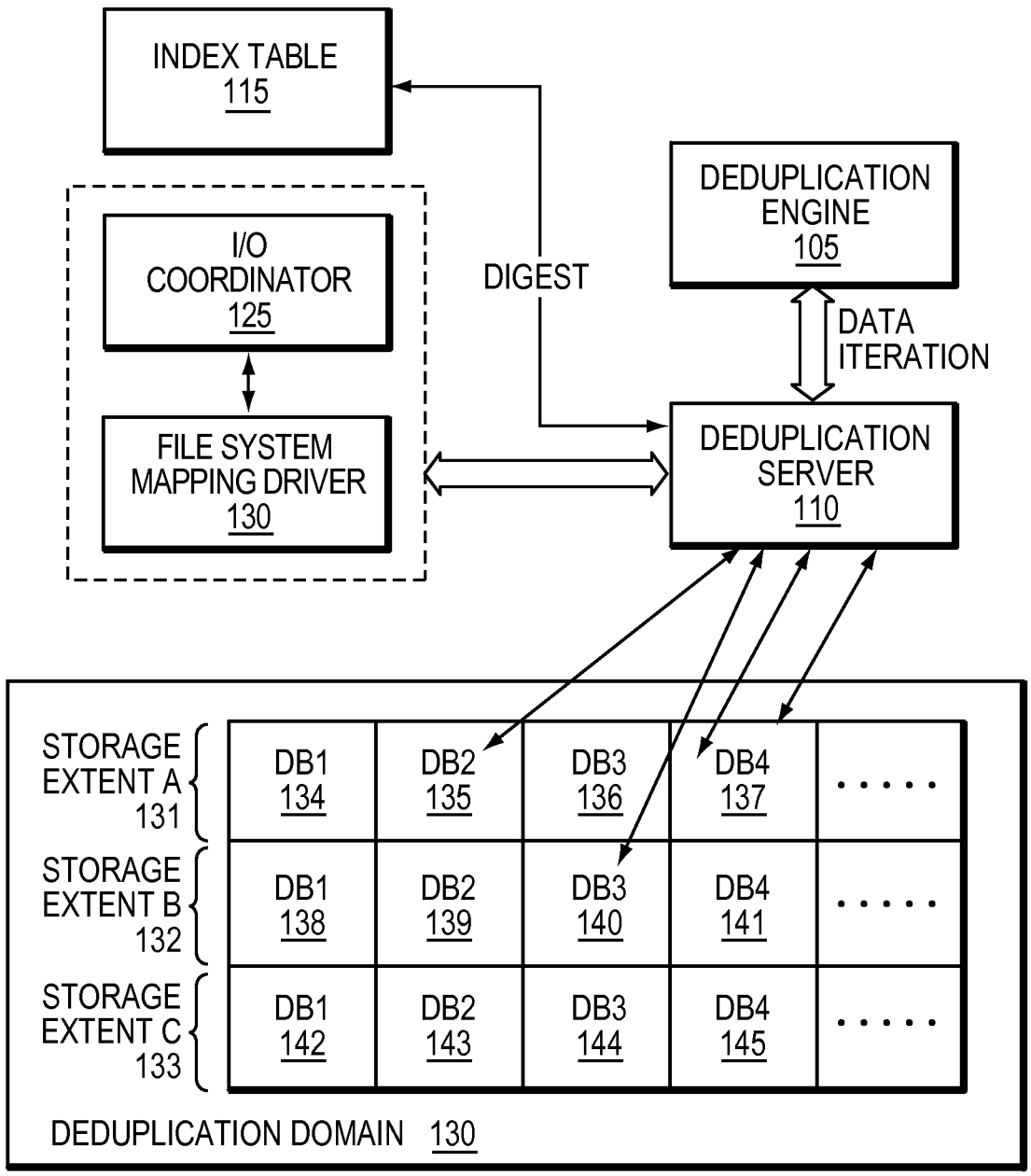
FIGS. 4-7 are diagrams illustrating in more detail components that may be used in connection with techniques herein.

Referring to FIG. 4, shown is a more detailed representation of components that may be included in an embodiment using the techniques described herein. In a deduplication domain, each storage extent contains a set of data blocks. For example, in FIG. 4, storage extent A 131, storage extent B 132 and storage extent C 133 are part of the deduplication domain 130. Within data storage system 12, there may be multiple deduplication domains. Within a deduplication domain, a goal of a deduplication process is to maintain only a single copy of each unique set of data. Software or other logic executing the deduplication process examines data in the deduplication domain in fixed sized chunks and determines whether the data stored in a chunk is the same as the data stored in another chunk in the same deduplication domain. If so, an address map for the LUNs is manipulated so that respective address map entries for the chunks reference the same physical chunk of data, and then the chunks that currently hold the extra copies of the data are freed up as unused storage. The address map for the LUNs stores a mapping of logical block addresses to physical block addresses. In at least some embodiments of the current technique, the fixed sized chunk can be a data block. For example, in FIG. 4, storage extent A 131 includes data blocks 134-137, storage extent B 132 includes data blocks 138-141 and storage extent C 131 includes data blocks 142-145 and other data blocks (not shown).

In at least one embodiment of the current technique, deduplication server 110 provides deduplication services in data storage system 12 by working in conjunction with I/O Coordinator 125 and File system mapping driver 130. I/O Coordinator 125 manages I/O operations in conjunction with the file system mapping driver 130. File system mapping driver 130 is a light-weight file system library that provides file system functionality and allows data storage system 12 to create files within a file system. File system mapping driver 130 processes I/Os directed to metadata of a file system and provides information regarding metadata (e.g., deduplication key, data block mapping information) of a data block that is potentially a candidate for deduplication.

In at least one embodiment of the current technique, data deduplication engine 105 executes a deduplication job by performing data deduplication on a deduplication domain by iterating through data blocks of the deduplication domain, obtaining digests for the data blocks, identifying deduplication candidates, and issuing deduplication requests to deduplication server 110.

In at least one embodiment of the current technique, deduplication server 110 is a component that provides services to deduplication engine 105 to iterate over sets of data in a set of deduplication domain 130. Deduplication server 110 also computes digests and works in conjunction with file system mapping driver 130 and I/O coordinator 125 to remap blocks after the deduplication technique is applied to remove duplicate blocks of data. A deduplication database (e.g. an index table) is maintained for a deduplication domain. Deduplication engine 105 communicates with the deduplication server 110 to iterate through the set of deduplication domain 130 and computes digests for data blocks that are iterated through. A digest is created for each chunk of data (e.g., a data block) that is identified as a candidate for deduplication. Deduplication engine 105 detects potential duplicate copies of data and issues a request to the deduplication server 110 to deduplicate the data. The deduplication database is stored on one of the storage extents that include one or more LUNs. An index table 115 may also be maintained on a LUN located in the same pool as the deduplication domain 130.

In at least some implementations, an index table is a persistent hash-table of chunk-IDs keyed by the digest of the data stored in the chunk. The index table need not contain entries for every data chunk in the deduplication domain, but the effectiveness of deduplication is a function of the number of entries stored in the index table 115. The more entries in the index table, the more likely that duplicate blocks will be detected during deduplication processing.

Deduplication of data happens in two logically distinct operations: detection and remapping. The detection operation identifies blocks containing the same data. The remapping operation updates address maps that record physical locations of logical units of data so that a single block of data is shared by multiple LUNs or by multiple positions within the same LUN. Detection is accomplished by building a database (e.g., index table 115) that maintains a digest (e.g., SHA, checksum) for each block. When two blocks have the same digest they have a sufficiently high probability of containing the same data to warrant a bit-for-bit comparison to confirm they are exact duplicates. Remapping leverages dynamic block-mapping technology of file system mapping driver 165. A file system allows dynamic manipulation of the address maps that connects LUN's logical address space to its physical address space. The file system also allows mapping a single block of storage at multiple locations within the file system, and allows handling of writes to shared blocks by allocating new storage and updating the shared address mappings. I/O coordinator 125 manages I/O operations in conjunction with the file system mapping driver 130. File system mapping driver 130 performs a deduplication operation by freeing up redundant instances of a deduplicated data block.

Thus, deduplication engine 105 and deduplication server 110 working in conjunction with one another identify data blocks for deduplication, compare data digest information of the data blocks, identify candidate data blocks for deduplication, issue deduplication requests, and maintain index table 115. Further, I/O coordinator 125 and file system mapping driver 130 working in conjunction with one another process deduplication requests received from deduplication server 110.

Figure 5:
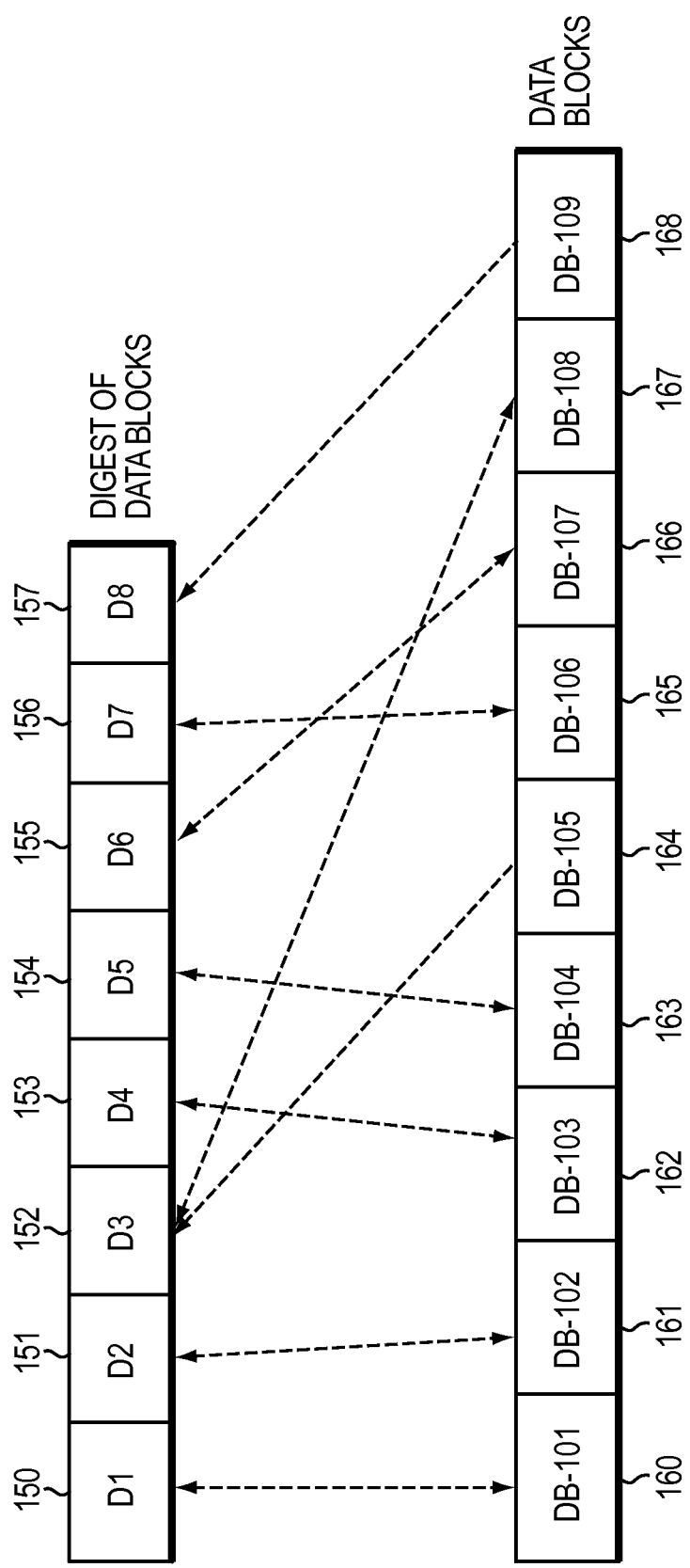

Referring to FIG. 5, shown is a more detailed representation of components that may be included in an embodiment using the techniques described herein. With reference also to FIGS. 1-4, in at least one embodiment of the current technique, a weak digest is used for a data block. For example, FIG. 5 indicates that data block DB-101 160 is associated with digest D1 150, data block DB-102 161 is associated with digest D2 151, data block DB-103 162 is associated with digest D4 153, data block DB-104 163 is associated with digest D5 154, data block DB-105 164 is associated with digest D3 152, data block DB-106 165 is associated with digest D7 156, data block DB-107 166 is associated with digest D6 155, data block DB-108 167 is associated with digest D3 152, and data block DB-109 168 is associated with digest D8 157.

Thus, FIG. 5 provides an example of a weak digest where data block DB-108 167 and DB-105 164 encounter a digest collision when both data blocks are associated with the same digest D3 152 but have different content. Thus, in such a case, in a conventional system, if a data block with the digest D3 152 is evaluated for deduplication and the digest of the data block matches with the digest of data blocks DB-105 164 and DB-108 167, the data block may either be identical to data block DB-105 164 or identical to data block DB-108 167. Further, the data block may not be identical to either of the data blocks DB-108 167 and DB-105 164. Further, in such a conventional system, it may not be possible to determine which data block to read and compare for deduplication. Further, in such a conventional system, reading each and every data block that may have matching digest consumes a large amount of time and storage resources.

In at least one embodiment of the current technique, a deduplicating technique uses a weak digest in such a way that upon detecting a digest collision, a determination regarding whether to read contents of data blocks for comparing data is based on evaluation of digest information of a set of data blocks adjacent to a candidate data block selected for deduplication based on a matching digest. For example, in at least one embodiment of the current technique, a weak digest such as Cyclic Redundancy Check (CRC) is used for deduplicating data. CRC may also be used as an error detection and correction mechanism in a data storage system. A data storage system computes and stores CRC for each data block such that when a data block is accessed, a new CRC is computed for the data block to determine whether the new CRC matches with the CRC that has been stored. If the new CRC matches with the stored CRC, the data block is considered a valid data block and access to the data block is granted. However, if the new CRC does not match with the stored CRC, the data block is considered as an invalid data block that may have been corrupted. In such a case, the data storage system may attempt to recover from an error. Generally, the size of a CRC value for a data block may range from 8 bytes to 32 bytes. Thus, a CRC value may be used as a digest in the index table 115. However, when a CRC value is used as a digest, a deduplicating technique may encounter a high digest collision rate because CRC is a weak digest.

Figure 6:
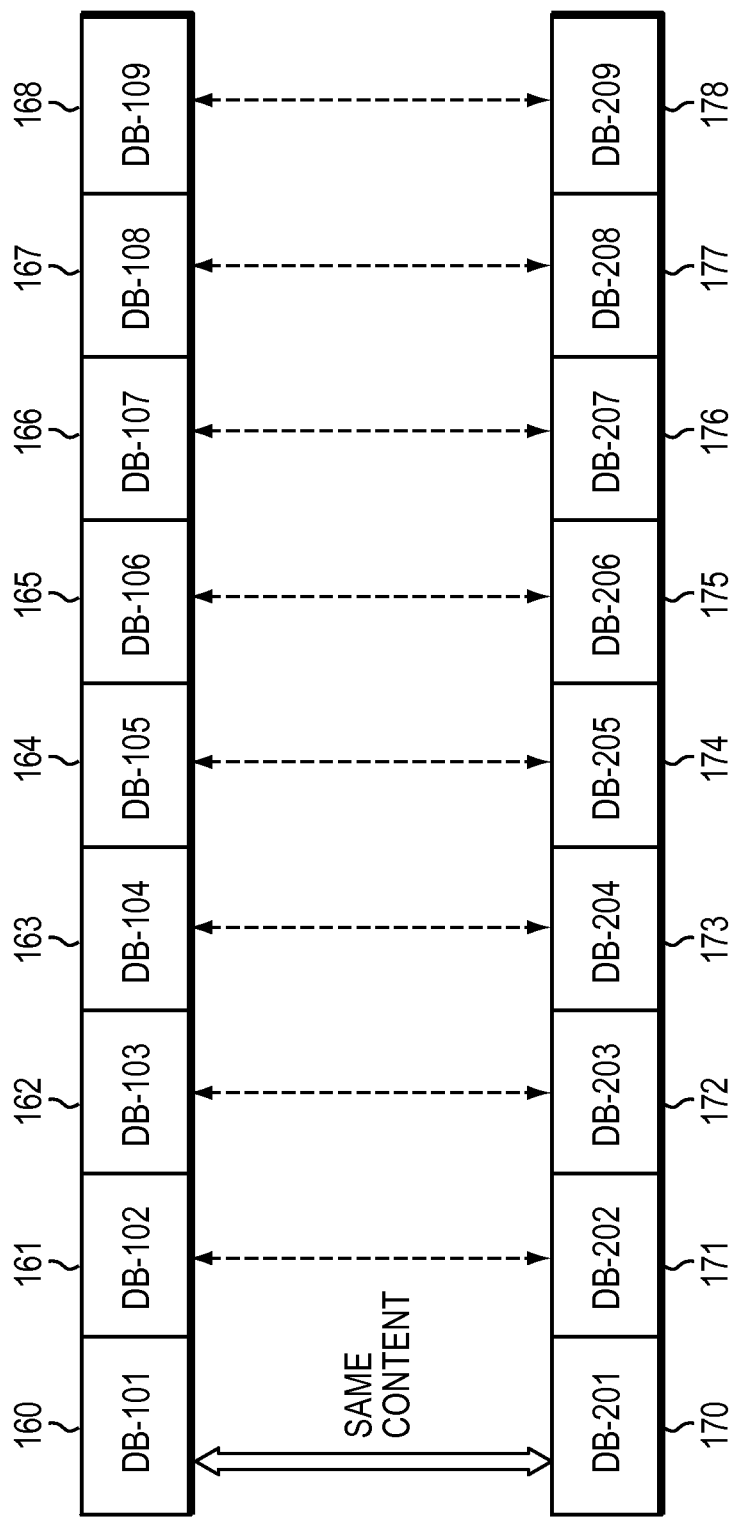

Referring to FIG. 6, shown is a more detailed representation of components that may be included in an embodiment using the techniques described herein. With reference also to FIGS. 1-5, a data storage system generally may exhibit a strong locality of reference because data is written to the data storage system in large chunks. Thus, for example, if a data block (e.g., DB-101 160) is found to be identical to another data block (e.g., DB-201 170), there may be a high probability of data blocks adjacent to the data blocks DB-101, DB-201 being identical to each other as well. Thus, for example, as illustrated in FIG. 6, there may be a high probability that data block DB-202 171 is identical to data block DB-102 161. Similarly, there may be a high probability that data block DB-203 172 is identical to data block DB-103 162, data block DB-204 173 is identical to data block DB-104 163, data block DB-205 174 is identical to data block DB-105 164, data block DB-206 175 is identical to data block DB-106 165, data block DB-207 176 is identical to data block DB-107 166, data block DB-208 177 is identical to data block DB-108 167, and data block DB-209 178 is identical to data block DB-109 168. Thus, a set of data blocks may be identical to another set of data blocks indicating a strong reference of locality.

Deduplication daemon 105 finds data blocks that may be deduplicated by iterating over digest entries stored in the index table. Two or more data blocks that have same digest indicate that the data blocks are candidates for deduplication. For example, in FIG. 6, deduplication daemon 105 determines that digest for data blocks DB-101 160 and DB-201 170 is same indicating that data blocks DB-101 160 and DB-201 170 may be deduplicated. In at least one implementation in accordance with the current technique as described herein, if deduplication daemon 105 finds a digest entry in the index table matching to the digest of a data block being evaluated for deduplication, deduplication daemon 105 evaluates digests of a set of data blocks that are stored adjacent to the data block being evaluated for deduplication and the data block associated with the matching digest entry. In other words, if deduplication daemon 105 finds three or more data blocks where digest of the first data block matches with the digest of the at least two other data blocks, deduplication daemon 105 evaluates digests of a set of data blocks residing adjacent to the data blocks associated with the matching digest entries in order to determine which data block to read for comparing contents of the data blocks.

Figure 7:
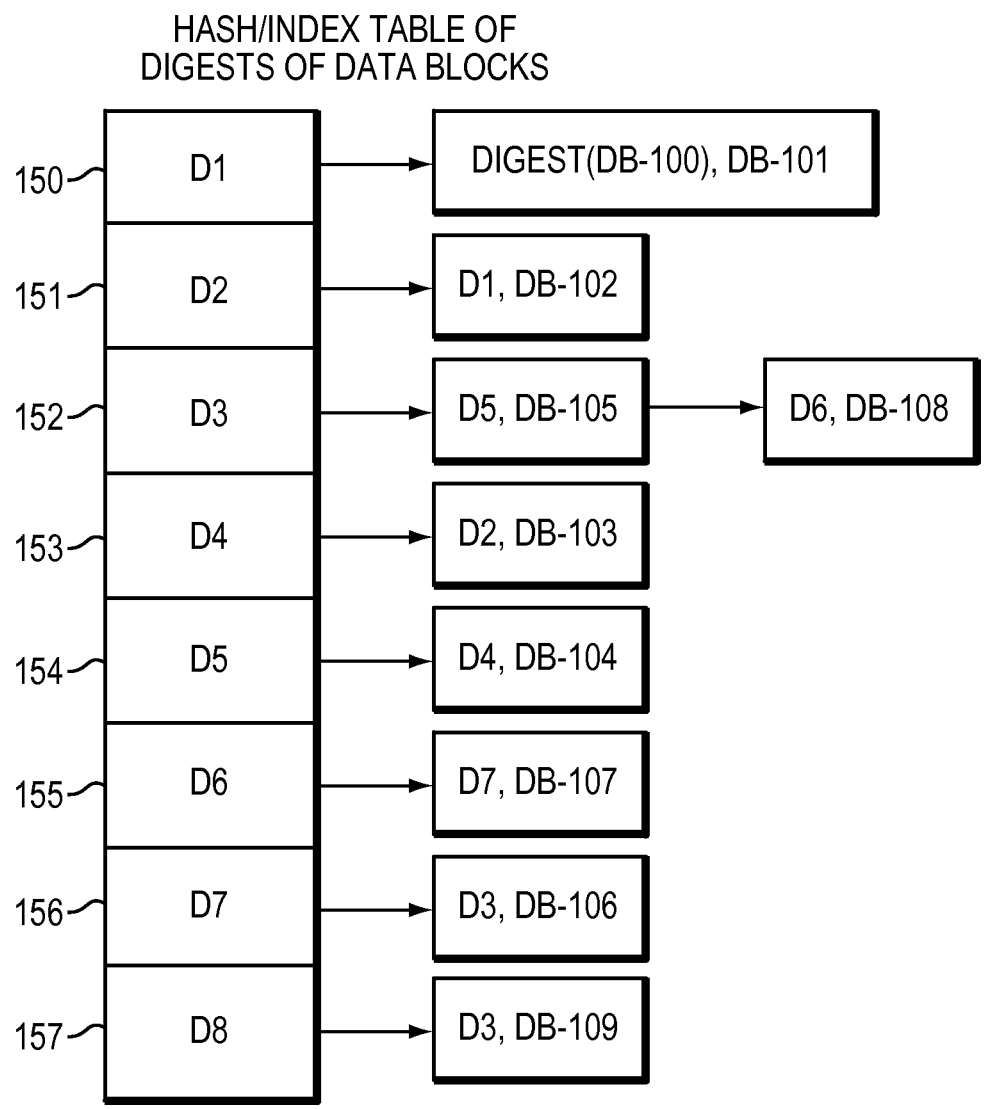

Referring to FIG. 7, shown is a more detailed representation of components that may be included in an embodiment using the techniques described herein. With reference also to FIGS. 1-6, in at least one embodiment of the current technique, the index table 115 (e.g., hash table) is updated to use a weak digest such that information regarding a set of data blocks having the same digest value is stored in the index table along with digest information of a set of adjacent data blocks. Thus, as illustrated in FIG. 7, each hash entry may be mapped to a list of data block entries. Further, each entry of the index table 115 which corresponds to a digest value associated with a data block includes a digest for a data block adjacent to the data block and block identification information for the data block. Thus, as illustrated in FIG. 7, entry 150 of index table corresponding to digest D1 of data block DB-101 160 refers to an entry including a digest for an adjacent data block (e.g., data block DB-100) and data block identification information for DB-101 160. Similarly, the second entry corresponding to digest D2 151 of data block DB-102 161 refers to an entry including digest for an adjacent data block (e.g., D1 for DB-101) and data block identification information for DB-102 161. Further, the entry corresponding to digest D3 152 refers to a list of two entries as both data blocks DB-105 164 and DB-108 167 have the same digest but different content indicating a digest collision. The first entry of the list of entries in such an example includes the digest for a data block adjacent to data block DB-105 164 (DB-104 163 with digest D4) and data block identification information for DB-105. The second entry of the list of entries in such an example includes a digest for a data block adjacent to data block DB-108 167 (DB-107 166 with digest D6) and data block identification information for DB-108 167. Further, the entry corresponding to digest D4 153 refers to an entry including digest for an adjacent data block (e.g., D2 for DB-102 161) and data block identification information for DB-103 162. Further, the entry corresponding to digest D5 154 refers to an entry including digest for an adjacent data block (e.g., D4 for DB-103 162) and data block identification information for DB-104 163. Further, the entry corresponding to digest D6 155 refers to an entry including digest for an adjacent data block (e.g., D7 for DB-106 165) and data block identification information for DB-107 166. Further, the entry corresponding to digest D7 156 refers to an entry including digest for an adjacent data block (e.g., D3 for DB-105 164) and data block identification information for DB-106 165. Further, the entry corresponding to digest D8 157 refers to an entry including digest for an adjacent data block (e.g., D3 for DB-108 167) and data block identification information for DB-109 168.

In at least one embodiment of the current technique, a deduplicating technique uses weak digest for a data block in conjunction with digest information of data blocks adjacent to the data block for determining whether to read contents of the data block for comparison upon detecting a matching digest in the index table 115. Thus, for example, in FIGS. 6 and 7, when a request is received to deduplicate data block DB-205 174, the digest for DB-205 is computed and searched in the index table 115. The digest for DB-205 is computed as D3 in this example which matches with the entry D3 152 of the index table 115. The entry for D3 152 refers to two deduplication candidates which are data block DB-105 and data block DB-108 as both data blocks have the same digest value D3. Further, based on the information stored in index table 115, the deduplication server 110 determines that data block DB-204 173 which is adjacent to DB-205 174 is identical to data block DB-104 163 which in turn is adjacent to the data block DB-105 164. Thus, based on such determination, the deduplication server 110 further determines that there is a high likelihood that the data block DB-205 174 is identical to data block DB-105 164 instead of data block DB-108 167 because of a strong reference of locality. Thus, contents of data block DB-105 164 are read from a storage device and compared with contents of data block DB-205 174. Similarly, when a request to deduplicate data block DB-208 177 with digest value D3 is received, deduplication server 110 determines that data block DB-207 176 which is adjacent to DB-208 177 is identical to data block DB-107 166 which in turns is adjacent to the data block DB-108 167. Thus, based on such determination, the deduplication server 110 further determines that there is a high likelihood that the data block DB-208 177 is identical to data block DB-108 167 instead of data block DB-105 164. Thus, in such a case, contents of data block DB-108 167 are read from a storage device and compared with contents of data block DB-208 177.

It should be noted that even though an index entry of the index table as illustrated in FIG. 7 only stores digest of a preceding data block, the index entry may store digest information for a set of data blocks that are adjacent to a data block associated with the index entry. Further, it should be noted that an index entry may also store digests for a set of data blocks that are organized in a specific pattern with respect to the physical and/or logical location of a data block associated with the index entry.

Figure 8:
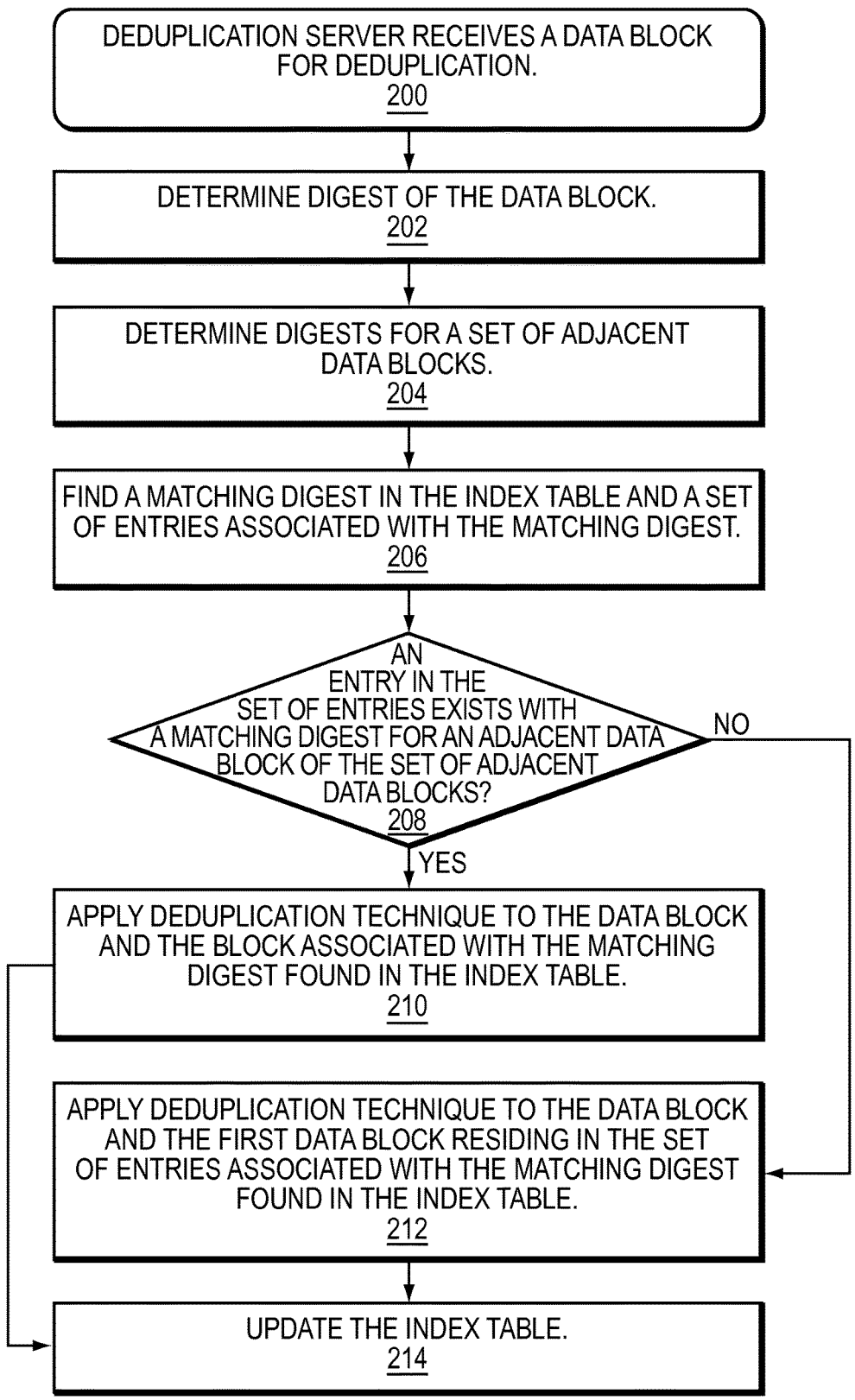
FIGS. 8-9 are flow diagrams illustrating processes that may be used in connection with techniques herein.

Referring to FIG. 8, shown is a flow diagram illustrating a flow of data in the data storage system. With reference also to FIGS. 1-7, in at least one embodiment of the current technique, deduplication server 110 receives a request to deduplicate a data block (step 200). Deduplication server 110 either computes a digest for the data block or retrieves the digest from another component of data storage system 12 (step 202). Further, deduplication server 110 determines digest of a set of data blocks that has recently been evaluated for deduplication. Thus, the deduplication server 110 uses digests of a set of data blocks that have been evaluated previously when deduplicating data blocks (step 204). Further, the digest of the data block is used to find a matching digest entry in the index table which may refer to a list of entries which is found to be candidate data blocks for deduplication (step 206). A determination is made as to whether an entry exists in the list of entries with a digest matching to a digest of a data block adjacent to the data block (step 208). Upon determining that such an entry exists which include the digest of the adjacent data block, the candidate data block referred to by that entry is used to deduplicate the data block (step 210). However, if either the deduplication server 110 have no knowledge of digest of any adjacent data block or no such entry exists in the list of entries with a digest matching to a digest of a data block adjacent to the data block, the block identification information of the first entry of the list is used for deduplicating the data block (step 212). When the data block is deduplicated, the index table 115 is updated to indicate that the data block has been deduplicated (step 214).

Figure 9:
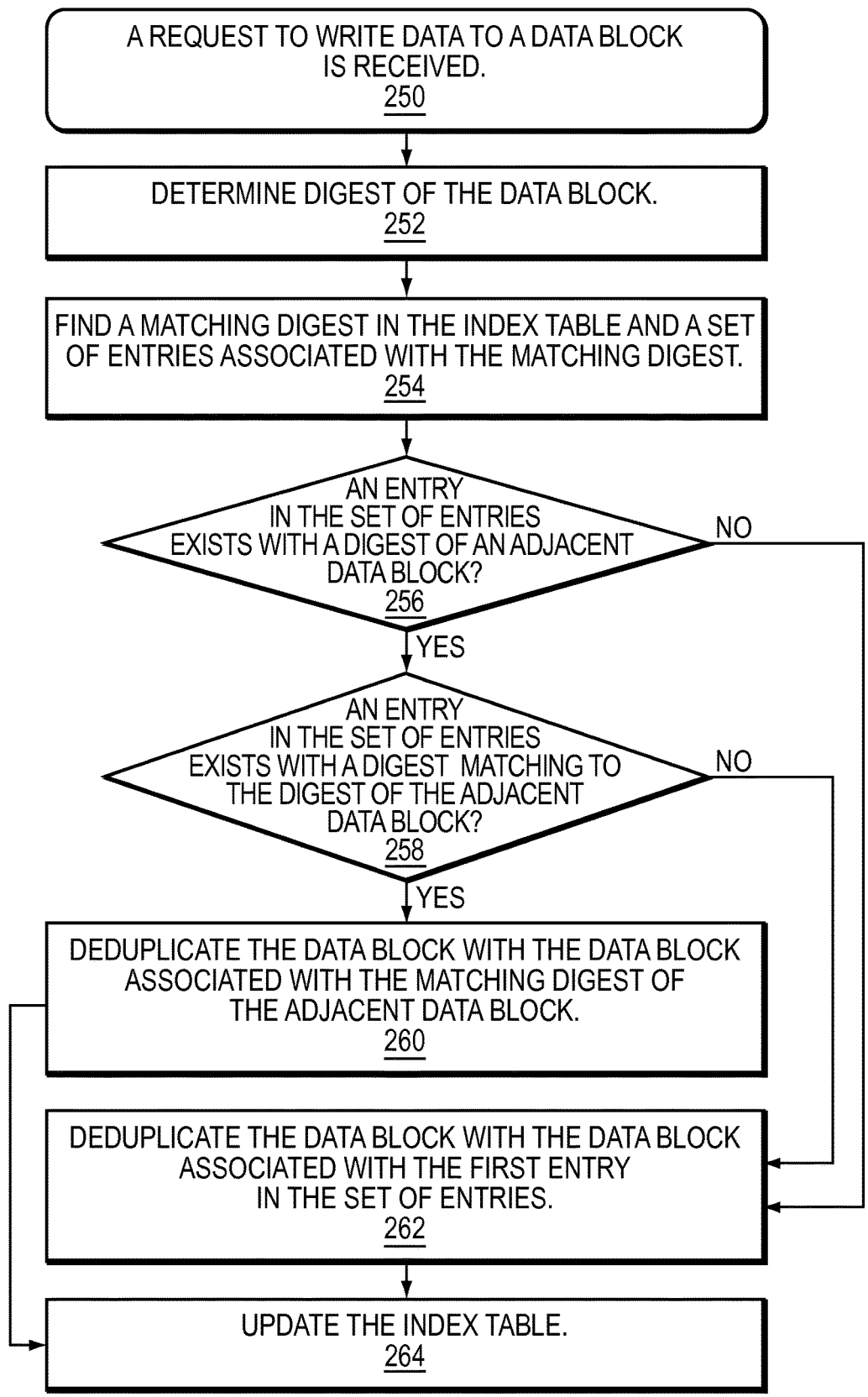

Referring to FIG. 9, shown is a flow diagram illustrating a flow of data in the data storage system. A data block may also be deduplicated when a request is received to write data to the data block. Upon finding that the data block may be deduplicated to a candidate data block, the write request writes data to the candidate data block after the data block is deduplicated to the candidate data block. With reference also to FIGS. 1-8, in at least one embodiment of the current technique, a request to write data to a data block is received (step 250). A digest such as a weak digest for the data block may either be computed or determined by another component of a data storage system (step 252). The digest of the data block is compared with the digest entries stored in the index table to find a digest matching with the digest of the data block (step 254). If the digest entry matching with the digest of the data block is found in the index table, a determination is made as to whether any entry in the list of entries referred to by the matching digest entry includes a digest of an adjacent data block (step 256). Upon finding that such an entry including a digest of a data block adjacent to the data block exists in the list of entries, a determination is made as to whether the digest of an adjacent data block matches with the digest of a data block adjacent to the data block being evaluated for deduplication (step 258). Upon finding that an entry of the list of entries includes a digest of an adjacent data block which matches the digest of the data block adjacent to the data block being evaluated for deduplication, a deduplication request is send to deduplicate the new data block with the data block corresponding to the matching adjacent data block digest (step 260). However, if either no entry is found including a digest of an adjacent data block or no digest matching to the digest of the data block adjacent to the data block being evaluated for deduplication is found, a deduplication request is send for the data block referred to by the first entry in the list of entries referred to by the digest index entry matching with the digest of the data block (step 262). At the end, the index table 115 is updated by either replacing an index entry if a digest matching a digest of an adjacent data block is found or by inserting a new entry to a list of entries referred to by the index entry of the index table if no such digest for an adjacent data block is found.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in deduplicating sets of data blocks, the method comprising:
   identifying a candidate data object for deduplicating a data object, wherein a digest associated with the candidate data object matches a digest associated with the data object wherein an index table stores digest information for the candidate data object and digest information for at least one data object residing adjacent to the candidate data object;
   upon detecting a digest collision, determining whether to apply a deduplicating technique to the candidate data object and the data object by evaluating digest information of a set of data blocks residing adjacent to the candidate data block, wherein evaluating the digest information of the set of data blocks residing adjacent to the candidate data block includes determining whether a first set of data objects residing adjacent to the data object is identical to a second set of data objects residing at adjacent to the candidate data object, wherein the first and second sets of data objects are selected based on a reference of locality indicating a likelihood of the data object being identical to the candidate data object, wherein whether the first set of data objects is identical to the second set of data objects is determined by evaluating respective digest information of the first and second sets of data objects, wherein each data object of a set of data objects is associated with a respective digest, wherein the digest collision indicates that at least two data objects storing different contents are associated with the same digest; and
   based on the determination that the first and second sets of data objects are identical to each other, applying a deduplicating technique to the data object and the candidate data object for deduplicating the data object to the candidate data object.

2. The method of claim 1, wherein a set of data objects resides on a storage extent comprising a set of LUNs, wherein each LUN of the set of LUNs is a logical representation of a subset of a physical disk storage.

3. The method of claim 1, wherein a data object includes a data block, wherein a data block is a fixed size chunk of physical disk storage.

4. The method of claim 1, wherein a digest associated with a data object includes a checksum value for the data object, wherein the digest is based on contents of the data object and uniquely identifies the data object.

5. The method of claim 1, wherein an index table comprises a set of index entries, wherein each index entry of the set of index entries is associated with a digest of a data object, wherein each index entry of the set of index entries includes a digest of an adjacent data object and information regarding the data object.

6. The method of claim 1, wherein the data object is deduplicated upon receiving a request to write data to the data object.

7. The method of claim 1, wherein the first set of data objects reside adjacent to the candidate data object, wherein the first set of data objects are identical to the second set of data objects residing adjacent to the data object.

8. The method of claim 1, further comprising:
evaluating a list of entries associated with an index entry of an index table, wherein the index entry is associated with the digest of the candidate data object;
determining whether an entry in the list of entries includes a digest for a data block residing adjacent to the candidate data object; and
based on the determination, determining whether the data object adjacent to the candidate data object is identical to a data object adjacent to the data object.

9. The method of claim 8, further comprising:
updating the index table.

10. The method of claim 1, wherein applying the deduplicating technique further comprising:
updating an address mapping of the candidate data object to point to the data object, wherein the candidate data object and the data object contain identical content of data, wherein an address mapping indicates a location of a data object on a disk storage; and
deleting the content of the candidate data object from the disk storage.

11. A system for use in deduplicating sets of data blocks, the system comprising a processor configured to:
identify a candidate data object for deduplicating a data object, wherein a digest associated with the candidate data object matches a digest associated with the data object wherein an index table stores digest information for the candidate data object and digest information for at least one data object residing adjacent to the candidate data object;
upon detecting a digest collision, determine whether to apply a deduplicating technique to the candidate data object and the data object by evaluating digest information of a set of data blocks residing adjacent to the candidate data block, wherein evaluating the digest information of the set of data blocks residing adjacent to the candidate data block includes determining whether a first set of data objects residing adjacent to the data object is identical to a second set of data objects residing at adjacent to the candidate data object, wherein the first and second sets of data objects are selected based on a reference of locality indicating a likelihood of the data object being identical to the candidate data object, wherein whether the first set of data objects is identical to the second set of data objects is determined by evaluating respective digest information of the first and second sets of data objects wherein each data object of a set of data objects is associated with a respective digest, wherein the digest collision indicates that at least two data objects storing different contents are associated with the same digest; and
apply, based on the determination that the first and second sets of data objects are identical to each other, a deduplicating technique to the data object and the candidate data object for deduplicating the data object to the candidate data object.

12. The system of claim 11, wherein a set of data objects resides on a storage extent comprising a set of LUNs, wherein each LUN of the set of LUNs is a logical representation of a subset of a physical disk storage.

13. The system of claim 11, wherein a data object includes a data block, wherein a data block is a fixed size chunk of physical disk storage.

14. The system of claim 11, wherein a digest associated with a data object includes a checksum value for the data object, wherein the digest is based on contents of the data object and uniquely identifies the data object.

15. The system of claim 11, wherein an index table comprises a set of index entries, wherein each index entry of the set of index entries is associated with a digest of a data object, wherein each index entry of the set of index entries includes a digest of an adjacent data object and information regarding the data object.

16. The system of claim 11, wherein the data object is deduplicated upon receiving a request to write data to the data object.

17. The system of claim 11, wherein the first set of data objects reside adjacent to the candidate data object, wherein the first set of data objects are identical to a second set of data objects residing adjacent to the data object.

18. The system of claim 11, further comprising:
evaluate a list of entries associated with an index entry of an index table, wherein the index entry is associated with the digest of the candidate data object;
determine whether an entry in the list of entries includes a digest for a data block residing adjacent to the candidate data object; and
determine, based on the determination, whether the data object adjacent to the candidate data object is identical to a data object adjacent to the data object.

19. The system of claim 18, further comprising:
update the index table.

20. The system of claim 11, wherein applying the deduplicating technique further comprising:
update an address mapping of the candidate data object to point to the data object, wherein the candidate data object and the data object contain identical content of data, wherein an address mapping indicates a location of a data object on a disk storage; and
delete the content of the candidate data object from the disk storage.

* * * * *